W. F. ZIMMERMANN.
HELICOIDAL BODY AND CUTTER FOR GEAR WHEELS.
APPLICATION FILED APR. 5, 1913.

1,151,324.

Patented Aug. 24, 1915.
4 SHEETS—SHEET 1.

WITNESSES
B. E. Barner
A. C. Blakeman.

INVENTOR
William F. Zimmermann.

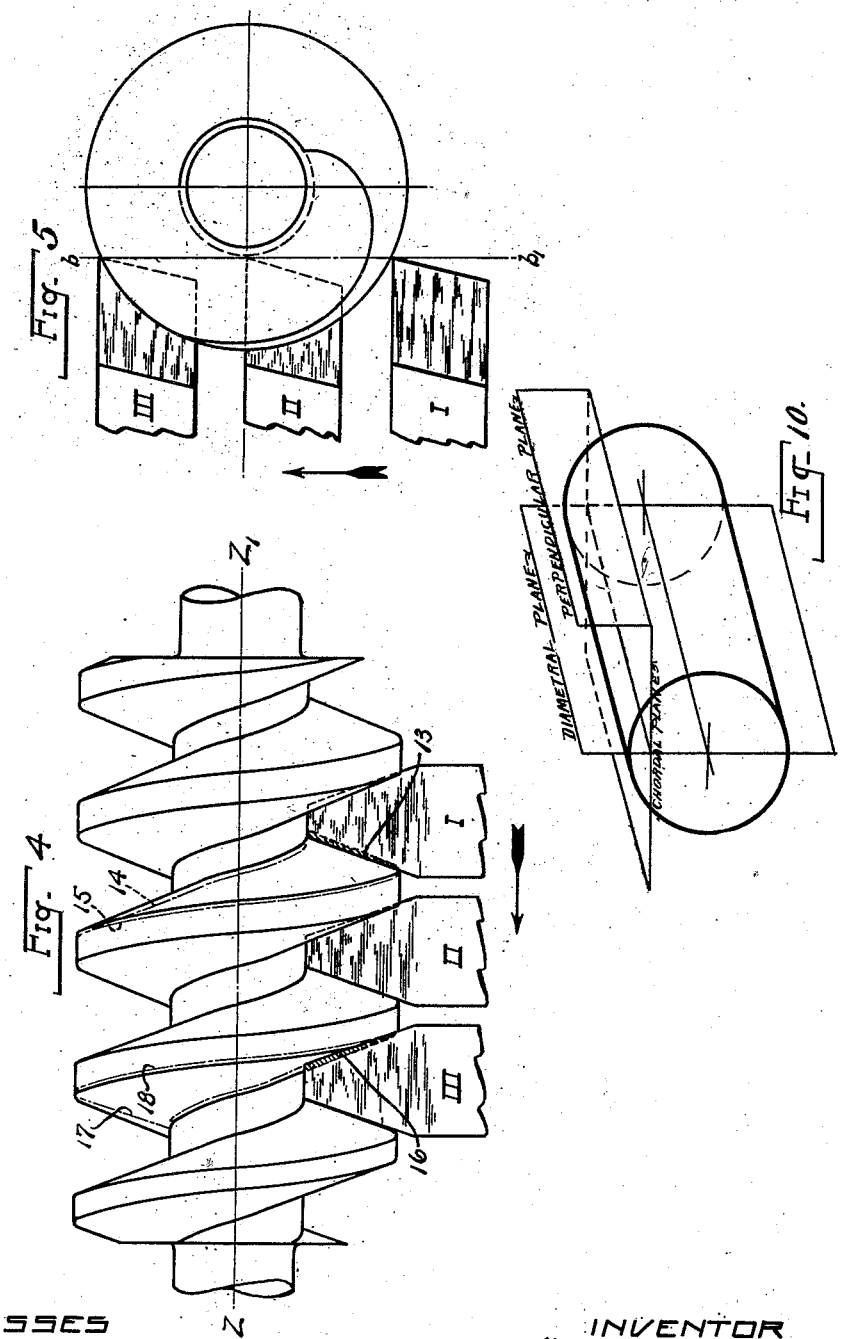

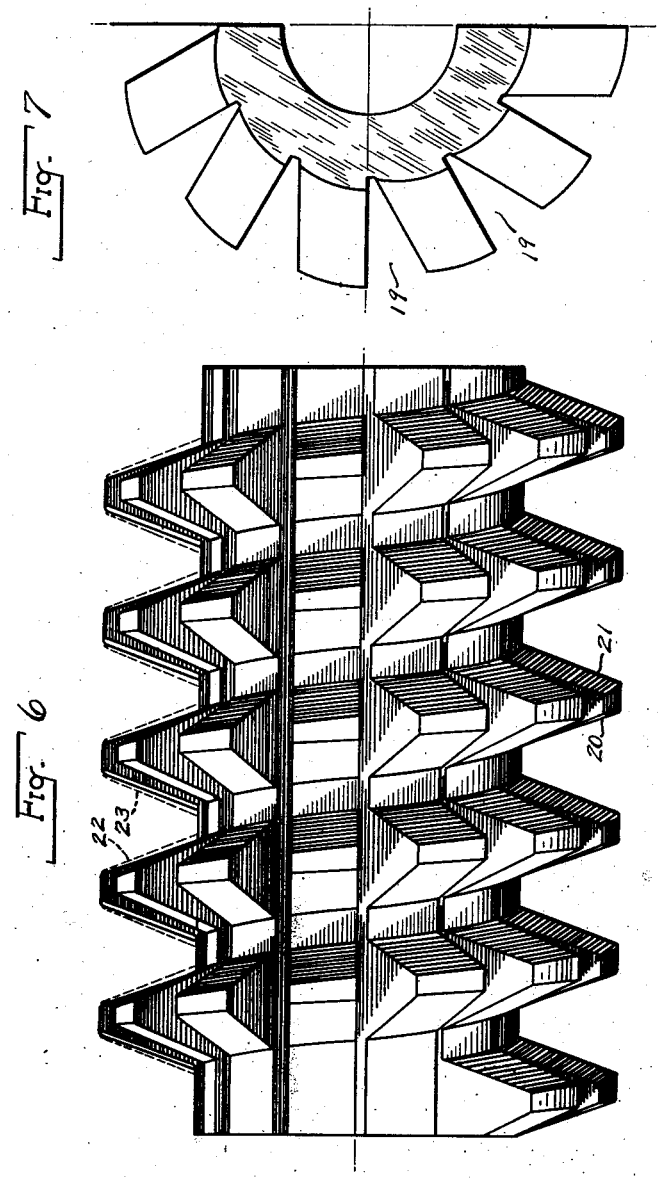

W. F. ZIMMERMANN.
HELICOIDAL BODY AND CUTTER FOR GEAR WHEELS.
APPLICATION FILED APR. 5, 1913.

1,151,324.

Patented Aug. 24, 1915.
4 SHEETS—SHEET 4.

WITNESSES

INVENTOR
William F. Zimmermann.

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

HELICOIDAL BODY AND CUTTER FOR GEAR-WHEELS.

1,151,324. Specification of Letters Patent. Patented Aug. 24, 1915.

Application filed April 5, 1913. Serial No. 759,110.

*To all whom it may concern:*

Be it known that I, WILLIAM F. ZIMMERMANN, a citizen of the United States, and a resident of Newark, in the county of Essex and State of New Jersey, have invented certain new and useful Improvements in Helicoidal Bodies and Cutters for Gear-Wheels, and do hereby declare the following specification, taken in connection with the drawings forming part of same, to be a full, clear, concise, and exact description of the principle, invention, and the best mode contemplated to apply said principle, so as to distinguish it from other inventions and enable any person skilled in the art to which it appertains or with which it is most nearly connected to make, construct, and use the same.

This invention relates primarily to a helicoid adapted to be used in connection with gearing and more particularly to a helicoidal cutter and a method to generate correctly, the tooth forms of gear wheels.

The primary object of this invention is to provide a helicoid which is so formed that when used with gear wheels, the projection of the various points of the helicoidal surfaces, on a plane perpendicular to a chordal plane, will envelop the basic form of the involute system of gear teeth.

A helicoid so formed and provided with cutting teeth in the usual manner and known as a hob or rotary generating cutter is adapted to generate correctly the tooth forms of involute gear teeth.

The annexed drawings and description thereof set forth in detail certain mechanical forms which embody the principles of this invention. It is, however, to be understood that this invention is not limited to these particular forms.

The novelty of this invention will be readily understood from the drawings, which show constructions embodying the invention in its preferred form, and from the following description thereof, and is more specifically pointed out and distinctly claimed in the claims annexed to said specification.

Figure 1:
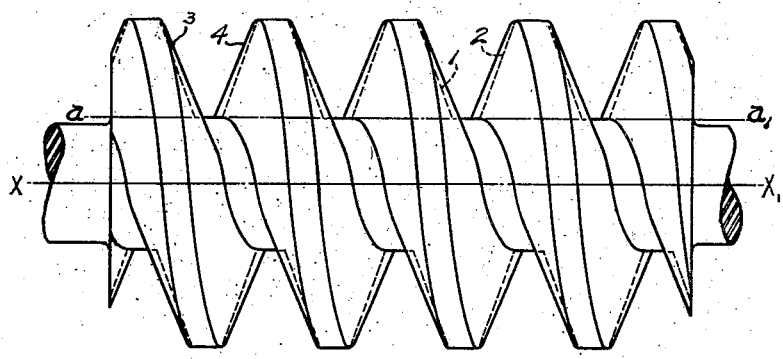
Figure 2:
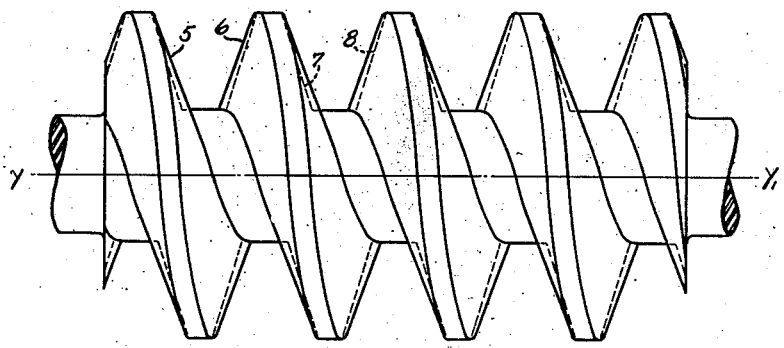
Figure 3:
Figure 8:
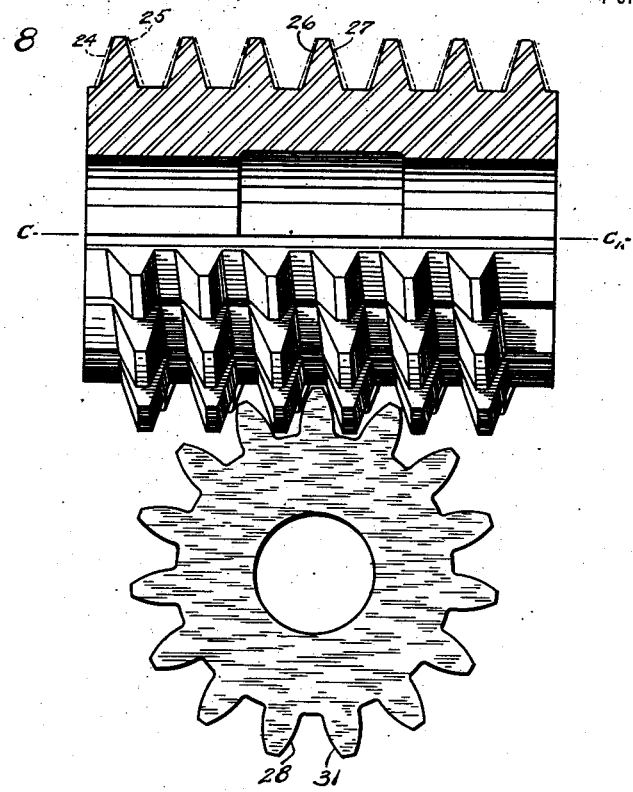
Figure 9:
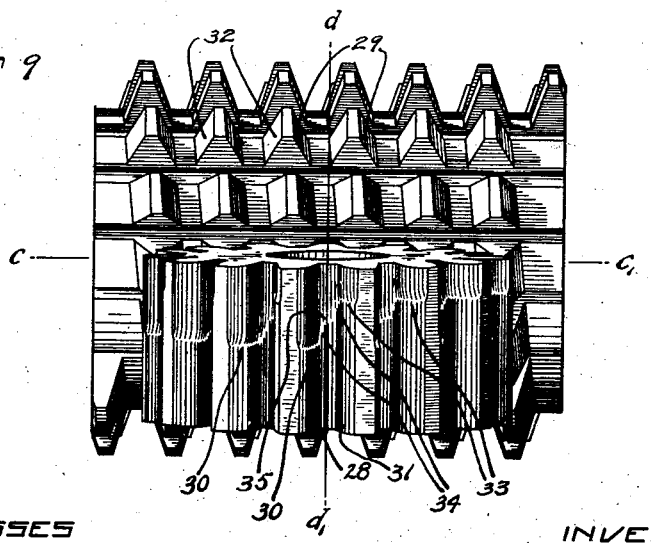

In the drawings: Figure 1 illustrates a helicoid commonly used in gearing. Fig. 2 is an illustration of a helicoid embodying the invention. Fig. 3 is a superimposed tooth section of Figs. 1 and 2, taken through the axes $X X_{i}$ and $Y Y_{i}$ respectively. Figs. 4 and 5 illustrate a method of producing the helicoid shown in Fig. 2. Figs. 6 and 7 show a helicoidal cutter embodying the invention. Fig. 8 shows a plan view of a modified helicoidal cutter in connection with a gear wheel illustrating the method of correctly forming the teeth of gear wheels by a rotary generating cutter. Fig. 9 is a front elevation of Fig. 8. Fig. 10 is a diagram showing the position of the various planes.

Helicoids as shown in Fig. 1 are generally used for worms or helicoidal cutter blanks, and are formed so that a section thereof in a diametral plane envelops the basic form of the involute system of gear teeth. The usual method employed to form a helicoid is to uniformly move the tool, provided with the basic involute form, in the direction of the helicoidal axis and simultaneously imparting an angular or rotary motion to said helicoid relative to the axial travel of the tool.

The surfaces of a helicoid formed as just described, when projected on a plane perpendicular to a chordal plane $a a_{i}$ of Fig. 1, will not envelop the basic or true rack form conjugate to the form of tooth of a gear meshing with such helicoid or worm. Such basic form is only found in a plane $X X_{i}$ passing through the axis of the helicoid.

In Fig. 1 of the drawings the dotted lines 1 and 2 show the form of the helicoidal teeth in a plane passing through the axis as at $X X_{i}$. These lines 1 and 2 also show the contour of the tool used to produce the helicoid. The full lines 3 and 4 show the form enveloped by projecting the various points of the helicoidal surfaces, on a plane perpendicular to the chordal plane $a a_{i}$.

The helicoid in Fig. 2 is made so that the full lines 5 and 6 envelop the basic form of the involute system of gear teeth and the dotted lines 7 and 8 represent the form of the tool used or a section in a plane passing through the axis $Y Y_{i}$.

By referring to Fig. 3 a comparison is shown between the axial sections of Figs. 1 and 2. The dotted lines 9 and 10 represent an axial section of Fig. 1 and the full lines 11 and 12 show a similar section of Fig. 2. The dotted lines 9 and 10 envelop the same shape as the full lines 5 and 6 of Fig. 2 which shape is substantially the basic form of the involute system of gear teeth.

Upon inspection of Fig. 3 it will be seen that the section shown by the full lines 11 and 12, representing an axial section of Fig. 2 is smaller in area than the dotted line section representing the axial section of Fig. 1. Furthermore, it is obvious that the included angle of the full lines 11 and 12 is less than that of the dotted lines 9 and 10.

The form of the tool to produce the helicoid of Fig. 2 represented by the dotted lines 7 and 8, is obtained by a process similar to that shown in Figs. 4 and 5 now to be explained. The helicoid shown in Fig. 4 is similar to that commonly used as a worm and is substantially the same as shown in Fig. 1. The numerals I, II and III represent different positions of the same tool. After the helicoid is formed in the usual manner, as hereinbefore described, by a tool placed in the position II as shown in Figs. 4 and 5, said tool is moved downward in a straight line from said position II to that at I, as shown in Fig. 5. The tool is then given the usual movement parallel to the axis Z Z, of the helicoid in the direction of the arrow in Fig. 4. After each passage of the tool from right to left in Fig. 4, it is raised in a straight line in the direction of the arrow in Fig. 5, or in other words, the tool is given a chordal feed, along the chord b b, until it reaches the position III. When the tool is below that of position II it cuts from the helicoid the portion 13, which is shown continued partly around the helicoid by the dot and dash lines 14 and 15. After the tool leaves position II and advances to position III it cuts the portion 16 from the helicoid, which is also shown continued partly around the helicoid by dot and dash lines 17 and 18. The dot and dash lines 14 and 17 resulting from the combined transverse and chordal travel of the tool are the same as the full lines 5 and 6 of Fig. 2 and an axial section of the helicoid so modified would therefore be the same as that shown by the dotted lines 7 and 8 of Fig. 2, and determines the shape of the tool to produce a modified helicoid without the chordal feed. The proper width and angles of the tool to produce the modified helicoid of Fig. 2 can also be determined by descriptive geometry by plotting a series of intersections of the tool along the chord of b b, with the helicoid, to determine the effect of the chordal feed.

The helicoidal cutter illustrated by Figs. 6 and 7 is made by providing a helicoid similar to that of Fig. 2 with flutes or grooves 19 and properly relieving the sides 20 and 21 to give the correct amount of clearance. The dotted lines 22 and 23 represent the projection of the points on the helicoidal surface of the cutter on a plane perpendicular to the chordal plane, and envelop substantially the same form as the full lines 5 and 6 of Fig. 2. The amount of variance between the basic involute form as represented by lines 22 and 23 of Fig. 6 and the actual shape of the cutting teeth with sides 20 and 21, best illustrated in Fig. 3, both as to thickness and included angle, is dependent upon the diameter of the cutter and the distance between the two consecutive teeth measured in the direction of the axis.

The process of cutting gear teeth with the helicoidal cutter shown in Figs. 6 and 7, is illustrated by Figs. 8 and 9. By inspection of said drawings it will be noted that the axis C $C_{\prime}$ of the helicoidal cutter is at right angles to the gear axis d $d_{\prime}$ and not at a slight angle thereto, equivalent to the angularity of the helicoid.

It has been the practice heretofore to set the cutter axis at an angle with the gear axis, equivalent to the angle of the helicoid. The difficulty with this, however, is in the fact that a true involute section is not presented to the face of the gear to be cut. The section brought at right angles to the axis of the gear by angularly adjusting the cutter, has the form of a part of an ellipse and not the straight line, necessary for the basic involute form. This fact is readily apparent when it is considered that a plane cutting a cylinder at an angle with the axis other than at right angles, will cut from said cylinder an elliptic section.

In Fig. 8 the dotted lines 24 and 25 represent the chordal projection of the helicoidal surfaces and the lines 26 and 27 represent the modified teeth of the helicoidal cutter which are substantially the same as the full line section 11 and 12 of Fig. 3.

The helicoidal cutter and gear blank are rotated in unison and are fed relatively to each other substantially parallel with the axis d $d_{\prime}$ of the gear blank. The forming of the gear tooth curve is accomplished by the movement of the helicoidal teeth along the axis c $c_{\prime}$ of the cutter as it is rotated. Figs. 8 and 9 represent a gear being recut with a finishing cutter to more clearly show the action of formation.

The curve 28 is formed by the sides 29 of the cutting teeth when they are below the center line c $c_{\prime}$ of Fig. 9, best seen at 30. The curve 31 is generated by the sides 32 of the cutting teeth when they are above the center line c $c_{\prime}$ of Fig. 9, best seen at 33. The lines 30 and 33 are straight and at right angles to the axis of the gear wheel and follow out the curve of the tooth from its two extremes. The center of the cutter C $C_{\prime}$ is half way between the lines 30 and 33 and these lines are connected by two angular lines 34 and the horizontal line 35 at the bottom of the tooth. As the feed progresses, the line 30 first disappears and a further feeding motion of the center C $C_{\prime}$ beyond the lower face of the gear will eliminate the line 33 and all of the gear tooth forms will be completed.

The action which takes place in forming the gear tooth curves, can also readily be seen from Figs. 4 and 5 by assuming that the helicoid is the cutting or forming tool, used to form the rack tooth shown at I and II with the portions 13 and 16 respectively removed. From these drawings it is manifest that the portion 13 is removed while the rack tooth is below the center Z Z$_1$ and the portion 16 is removed when said tooth is above said center Z Z$_1$, and practically nothing is removed as the tooth passes across the center of the helicoid.

Gear tooth curves formed as heretofore by angularly adjusting the axis of the helicoidal cutter had the disadvantage, not only of the elliptic section as hereinbefore described, but also that the flutes 19 (Fig. 7) had to be in a helical line necessarily normal to the teeth. This produced unsymmetric teeth so that when the two curves of two gears formed by opposite sides of the cutter were rolled together they did not have the proper rolling action but showed interferences. Now, with the process shown in Figs. 8 and 9 the helicoidal cutter is provided with flutes parallel with its axis and the cutter is at all times maintained at right angles with the gear axis, thereby dispensing with an angularly adjustable cutter bearing in the machine which has always been a detriment and also permitting of grinding the cutter upon its face without a specially designed grinding machine equipped for helicoidal grinding. Furthermore, when viewing the cutting faces of the teeth, along a flute in the direction of the axis, they will not have a warped appearance but will be perfectly radial, substantially the same as though each tooth was a single tool similar to that used in gear planing machines.

The result of these improvements in the cutter and method is that the gear tooth curves 28 and 31 are symmetrical and each will roll correctly with either curve reproduced in a mating gear. Each curve reproduced in the manner described will be a correct involute conjugate to the basic form.

Having described my invention, I claim as new and desire to secure by Letters Patent:

1. A helicoid having surfaces formed so that when projected on a plane perpendicular to a chordal plane and parallel to a diametral plane the basic form of a system of conjugate rolling curves is enveloped.

2. A helicoid having surfaces formed so that the projection, on a plane perpendicular to a chordal plane and parallel to a diametral plane of the portion of convolutions cut from said helicoid by said chordal plane will envelop the basic form of a system of conjugate rolling curves.

3. A helicoidal cutter having its cutting teeth so shaped in a diametral plane that the projection of the cutting edges of all of the teeth cut by a chordal plane, upon a plane perpendicular to said chordal plane and parallel to said diametral plane will envelop the basic form required.

WILLIAM F. ZIMMERMANN.

Witnesses:
  B. E. BARNES,
  A. C. BLAKEMAN.